US011694211B2

United States Patent
Huang et al.

(10) Patent No.: US 11,694,211 B2
(45) Date of Patent: Jul. 4, 2023

(54) CONSTANT-TIME CASCADING DELETION OF RESOURCES

(71) Applicant: STRIPE, INC., San Francisco, CA (US)

(72) Inventors: Ji Huang, San Francisco, CA (US); Tushar Dhoot, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 60 days.

(21) Appl. No.: 17/360,113

(22) Filed: Jun. 28, 2021

(65) Prior Publication Data

US 2022/0414678 A1    Dec. 29, 2022

(51) Int. Cl.
*G06Q 30/00* (2023.01)
*G06Q 30/016* (2023.01)
*H04L 67/025* (2022.01)

(52) U.S. Cl.
CPC ......... *G06Q 30/016* (2013.01); *H04L 67/025* (2013.01)

(58) Field of Classification Search
CPC .............................. G06Q 30/016; H04L 67/025
See application file for complete search history.

(56) References Cited

U.S. PATENT DOCUMENTS 5,706,494 A * 1/1998 Cochrane .............. G06F 16/284
5,812,773 A * 9/1998 Norin .................. H04L 49/9094
709/248

(Continued)

OTHER PUBLICATIONS

International Search Report and Written Opinion on the Patentability of Application No. PCT/US2022/032898 dated Sep. 28, 2022, 11 pages.

(Continued)

*Primary Examiner* — Nicholas P Celani
*Assistant Examiner* — Wuji Chen
(74) *Attorney, Agent, or Firm* — Womble Bond Dickinson (US) LLP

(57) ABSTRACT

A method and apparatus for deleting resources are described. In one embodiment, the method comprises: detecting, by a network commerce system, a deletion request in a first message sent over a network as an electronic communication to delete a first resource; identifying one or more additional resources that have a hierarchical relationship to the first resource, including identifying one or more child resources related the first resource, the one or more child resources being in a parent-child relationship with the first resource as the parent; causing a module of the network commerce system to perform a delete action with respect to the first resource, where the delete action deletes the first resource and causes the one or more child resources to be deleted in the future and to appear deleted when receiving access requests prior to deletion of the one or more child resources; detecting, by the network commerce system, an access request in a second message sent over the network as an electronic communication to access one child resource of the one or more child resources after deletion of the first resource but prior to deletion of the one child resource; determining, in response to the access request, if the first resource has been deleted; and denying access to the one child resource if the first resource is determined to have been deleted.

17 Claims, 8 Drawing Sheets

(56) References Cited

U.S. PATENT DOCUMENTS

| | | | |
|---|---|---|---|
| 6,327,243 B1* | 12/2001 | Gregorat | H04L 69/40 370/412 |
| 7,240,054 B2* | 7/2007 | Adiba | G06F 16/2365 |
| 7,536,407 B2* | 5/2009 | Lei | G06F 16/289 707/999.005 |
| 7,962,532 B1* | 6/2011 | Pogde | G06F 16/122 707/828 |
| 8,515,911 B1* | 8/2013 | Zhou | G06F 16/1873 707/649 |
| 8,868,531 B2* | 10/2014 | Majnemer | G06F 16/2246 707/704 |
| 9,740,583 B1* | 8/2017 | Brandwine | G06F 21/6218 |
| 9,798,784 B1* | 10/2017 | Wong | G06F 21/604 |
| 9,922,035 B1* | 3/2018 | Ulman | G06F 16/125 |
| 10,154,039 B1 | 12/2018 | Andruschuk et al. | |
| 10,860,550 B1* | 12/2020 | Chheda | G06F 16/2379 |
| 2003/0074450 A1* | 4/2003 | Kang | H04L 12/2803 709/227 |
| 2003/0101300 A1* | 5/2003 | Goldick | G06F 9/52 710/200 |
| 2004/0186845 A1* | 9/2004 | Fukui | G06F 16/2246 |
| 2005/0171960 A1* | 8/2005 | Lomet | G06F 16/2272 |
| 2005/0234989 A1* | 10/2005 | Bailey | G06F 16/2343 |
| 2006/0212496 A1* | 9/2006 | Romine | G06F 16/288 |
| 2007/0118547 A1* | 5/2007 | Gupta | G06F 16/2272 |
| 2007/0174329 A1* | 7/2007 | Anderson | G06F 16/217 707/999.102 |
| 2007/0233925 A1* | 10/2007 | Zhou | G06F 16/9024 710/266 |
| 2009/0037427 A1* | 2/2009 | Hazlewood | G06F 16/278 |
| 2009/0292706 A1* | 11/2009 | Ishimoto | G06F 16/2343 |
| 2009/0313218 A1* | 12/2009 | Hampton | G06F 16/2453 |
| 2009/0313311 A1* | 12/2009 | Hoffmann | G06F 11/2097 |
| 2009/0327262 A1 | 12/2009 | Grack et al. | |
| 2010/0082748 A1* | 4/2010 | Banks | H04L 67/56 709/206 |
| 2011/0238706 A1* | 9/2011 | Wong | G06F 16/284 707/E17.055 |
| 2011/0320419 A1* | 12/2011 | Johnston | G06F 16/219 707/703 |
| 2012/0297249 A1* | 11/2012 | Yang | G06F 9/5072 714/E11.131 |
| 2013/0046906 A1* | 2/2013 | Ripberger | G06F 3/0637 710/12 |
| 2013/0204902 A1* | 8/2013 | Wang | G06F 16/2365 707/E17.012 |
| 2014/0074841 A1* | 3/2014 | Majnemer | G06F 16/2246 707/E17.002 |
| 2015/0096052 A1* | 4/2015 | Hua | H04L 63/102 726/28 |
| 2016/0034507 A1* | 2/2016 | Aron | G06F 16/16 707/722 |
| 2017/0103099 A1* | 4/2017 | Bitar | G06F 16/2282 |
| 2017/0286208 A1* | 10/2017 | Hives | G06F 11/0793 |
| 2018/0089249 A1* | 3/2018 | Collins | G06F 16/282 |
| 2018/0176894 A1* | 6/2018 | Tang | H04L 5/0032 |
| 2018/0261037 A1* | 9/2018 | Hudson | B33Y 50/00 |
| 2020/0004852 A1* | 1/2020 | Qiu | G06F 11/1446 |
| 2020/0341948 A1 | 10/2020 | Steinke | |
| 2021/0182271 A1* | 6/2021 | Pula | G06F 16/2282 |
| 2021/0279225 A1* | 9/2021 | Jeon | G06F 16/2343 |
| 2022/0058165 A1* | 2/2022 | Kussmann | G06F 16/2272 |
| 2022/0261386 A1* | 8/2022 | Negi | G06F 16/288 |
| 2022/0318218 A1* | 10/2022 | Lin | G06F 16/24552 |

OTHER PUBLICATIONS

Peter Bailis et al., 'Feral Concurrency Control: An Empirical Investigation of Modern Application Integrity', In: SIGMOD'15: Proceedings of the 2015 ACM SIGMOD International Conference on Management of Data, pp. 1327-1342, May 27, 2015.

Zhaoyang Han et al., 'An efficient access control scheme for smart lock based on asynchronous communication', In: ACM TURC'19: Proceedings of the ACM Turing Celebration Conference—China, Article No. 61, pp. 1-5, May 17, 2019.

* cited by examiner

US 11,694,211 B2

CONSTANT-TIME CASCADING DELETION OF RESOURCES

FIELD

Embodiments of the present invention relate to the field of distributed systems; more particularly, embodiments of the present invention relate to deleting and handling accesses to resources in a distributed system.

BACKGROUND

A distributed system contains multiple nodes that are physically separate but communicate with each other using a network. The nodes in the distributed system handle processes in tandem and can be arranged as client/server systems in which the client requests a resource and the server provides that resource.

Resources in a distributed system may include software and hardware and are often shared by a number of systems. Some of the resources are referred to as user-facing resources. User-facing resources include software that a user or customer deals with directly. For example, a user-facing resource can be a customer resource in a commerce platform.

Many user-facing resources are stored in a distributed fashion, and some resources have relationships with other resources, but are not necessarily co-located. For example, a payment processor of a commerce platform may handle subscriptions for a company's customers. To support the handling of the subscriptions for the company, the payment processor may utilize separate resources including a resource to handle user information related to the signing up and/or cancelling a subscription, a resource to handle the generation of recurring bills for a subscription, and resource for handling payments for the subscription. These resources are interrelated and each include data regarding a user and their subscription, such that they "belong" to each other.

When a request is issued by a user to delete a user-facing resource (e.g., a customer resource), all resources "belonging to" the resource (e.g., subscriptions of that customer) being deleted must also be deleted. This is often done by putting a lock on the resources while performing their deletion, which prevents the resources from being used until the information is deleted. If there are too many resources belonging to the resource being deleted, the request can take a long time to complete the deletion and thus time out, thereby causing a degraded experience to users.

SUMMARY

A method and apparatus for deleting resources are described. In one embodiment, the method comprises: detecting, by a network commerce system, a deletion request in a first message sent over a network as an electronic communication to delete a first resource; identifying one or more additional resources that have a hierarchical relationship to the first resource, including identifying one or more child resources related the first resource, the one or more child resources being in a parent-child relationship with the first resource as the parent; causing a module of the network commerce system to perform a delete action with respect to the first resource, where the delete action deletes the first resource and causes the one or more child resources to be deleted in the future and to appear deleted when receiving access requests prior to deletion of the one or more child resources; detecting, by the network commerce system, an access request in a second message sent over the network as an electronic communication to access one child resource of the one or more child resources after deletion of the first resource but prior to deletion of the one child resource; determining, in response to the access request, if the first resource has been deleted; and denying access to the one child resource if the first resource is determined to have been deleted.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, to avoid obscuring the present invention.

Techniques are disclosed herein for handling access to and deletion of resources in a distributed environment (e.g., a platform). In some embodiments, access to one resource is made based on whether the parent resource of the one resource has been deleted. In such a case, when an access request for the one resource is received, its parent resource is accessed and whether the parent resource has already been deleted determines whether access to the one resource is granted.

As access to a resource is controlled by whether its parent resource has been deleted, when a request is received to delete a particular resource, the distributed system deletes that resource and designates all the child resources of the deleted resource for deletion as well. That is, when a request is received to delete a resource, its child resources are also deleted. The deletion of those child resources may not occur immediately, and thus the system prevents accesses to all of the child resources during the time the system has designated them for deletion but has not completed that deletion. Thus, in some embodiments, when deleting a parent resource, all associated resources (e.g., child resources) are also cleaned up. While this may include deletion, in some embodiments, the deletion operation can comprise moving the resource to a terminal state. For example, in some embodiments, when deleting a customer, resources to handle all associated subscriptions are canceled, and resources to handle all invoices of those subscriptions should be considered uncollectible.

In the case described here, when a request is received to delete the parent resource, the system marks the parent as deleted. As such, when access to child resources are attempted, the system first attempts to access the deleted parent resource and upon determining that the parent resource has been deleted, the system causes the access of the child resources to fail.

In some embodiments, one or more of the resources are user-facing and distributed resources. In some embodiments, the related resources are deleted in a cascading fashion. For example, if a request to delete the parent resource is received, the system deletes the parent resource and then deletes all of its child resources in an asynchronous fashion. In alternative embodiments, some or all of the related resources are deleted at the same time. In some embodiments, the deletion of the resources occurs in constant-time.

Figure 1:
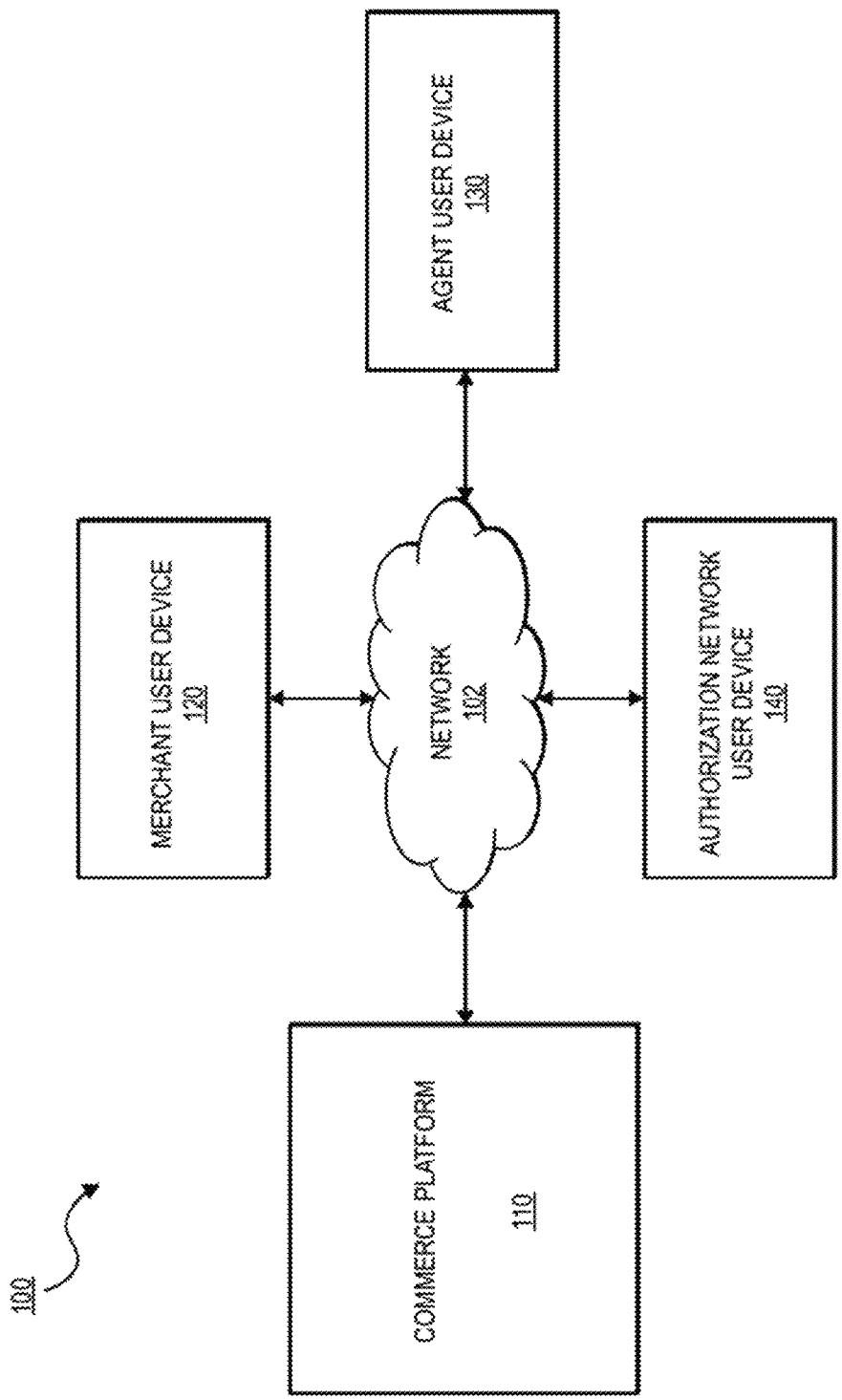
FIG. 1 is a block diagram of an exemplary system architecture for a commerce platform.

FIG. 1 is a block diagram of an exemplary system 100 architecture for a commerce platform environment. In some embodiments, system 100 includes a commerce platform 110, a merchant user device 120, an agent user device 130, and an authorization network user device 140. In some embodiments, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, agent user device 130, and authorization network user device 140 may be coupled to a network 102 and communicate with one another using any of the standard protocols for the exchange of information, including secure communication protocols. In some embodiments, one or more of the commerce platforms 110, merchant user device 120, agent user device 130, and authorization network user device 140 may run on one Local Area Network (LAN) and may be incorporated into the same physical or logical system, or different physical or logical systems. Alternatively, the commerce platform 110, merchant user device 120, agent user device 130, and authorization network user device 140 may reside on different LANs, wide area networks, cellular telephone networks, etc. that may be coupled together via the Internet but separated by firewalls, routers, and/or other network devices. In some embodiments, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In some embodiments, commerce platform 110 provides financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™.

In some embodiments, commerce platform 110 comprises a number of software platforms that are compatible with each other. These platforms may include one or more frontend platforms and one or more backend platforms. The frontend platforms may include user interface code that is used to access services provided by one or more backend platforms. The software platforms may involve authenticating user information (e.g., username, passwords, login information, financial information, etc.). The software platforms may involve creating tokens and maintaining and verifying publishable (non-secret) keys and secret keys in a manner well-known in the art, or providing a Stripe.js enabled Payment Form using standard web technologies, such as described in U.S. Pat. Nos. 10,134,036, 9,830,596, and 9,824,354. The software platforms may involve authorizing or validating payment information, approving or declining transactions, and settling any charges that are made. The software platforms may involve browsers.

Figure 2:
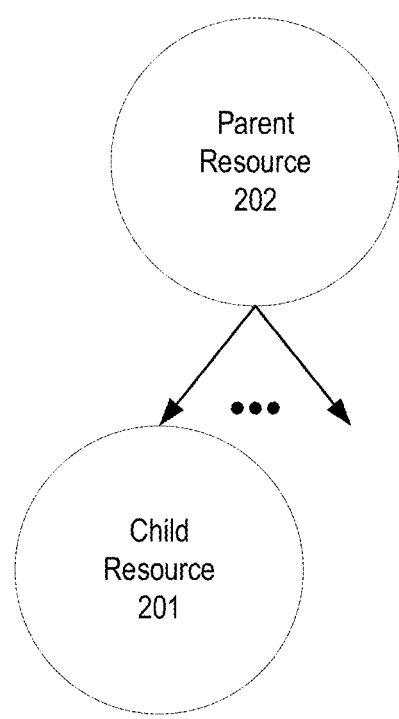
FIG. 2 illustrates a parent-child resource arrangement in a tree-like structure.

In some embodiments, the frontend and backend platforms utilize resources (e.g., shared resources) to perform their tasks. In some embodiments, the resources have a hierarchical relationship with each other. For example, two resources may have a parent-child relationship. FIG. 2 illustrates a child resource 201 with a parent resource 202 in a tree-like structure. Child resource 201 belongs to parent resource 202. Parent resource 202 may have additional child resources associated with it.

Figure 3:
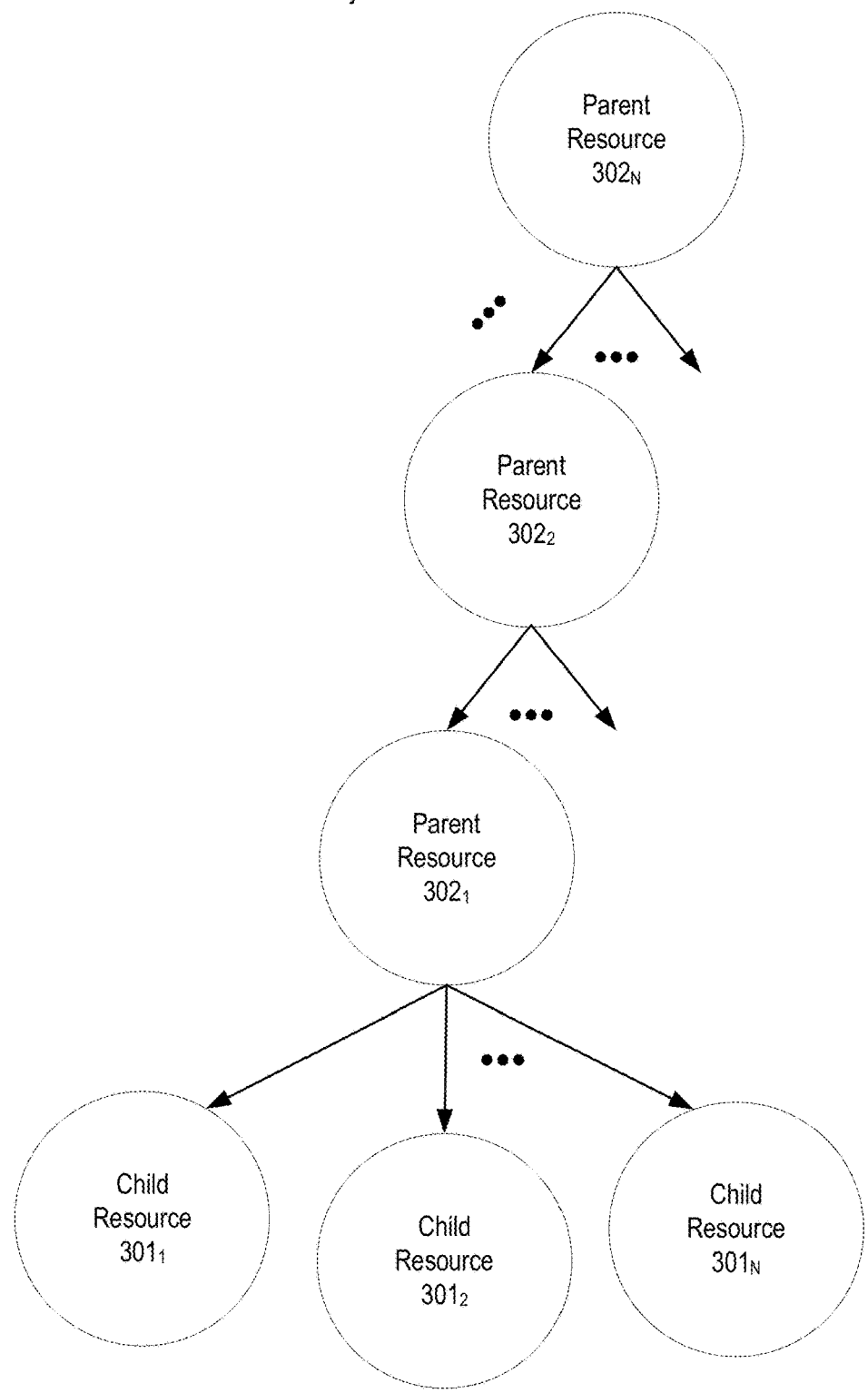
FIG. 3 illustrates a tree structure having multiple levels of parent-child relationships.

In some embodiments, the hierarchy of resources can have multiple levels. FIG. 3 illustrates a tree structure having multiple levels of parent-child relationships. Referring to FIG. 3, parent resource $302_1$ has child resources $301_{1-N}$. However, parent resource $302_1$ is a child resource of parent resource $302_2$, which is a child resource of another parent resource. This continues to parent resources $302_N$ at the top of the tree.

As an example, in a commerce platform, a customer resource may have a number of resources that are associated with it such as, for example, but not limited to, subscription resources, invoice generation resources, recurring payment resources to handle payments, report generating resources, etc. If a user-facing resource like the customer resource is to be deleted, then all of these associated resources are also deleted. While deleting all of these related resources, to avoid having to lock a number of resources and/or preventing access to resources for unacceptable periods of time, the commerce platform and its associated distributed system delete the user-facing resource and cause all future accesses to child resources of the user-facing resource to start with an access to the user-facing resource to see if it's not been deleted in order to determine whether to grant access to the child resource of the user-facing resource. In other words, in some embodiments, all accesses to child resources are made by first accessing their parent resource to see if it's been deleted, and if the parent resource hasn't been deleted, then the system grants access to the child resource. If the system determines that the parent resource has been deleted, then the system denies access to the child resource. Thus, the deletion of a user-facing resource is accomplished by enforcing the relationship hierarchy during both updates and retrievals of resources (e.g., child resources) belonging to other resources (e.g., parent resources).

Note that in some embodiments, the customer can potentially be the root of the tree, i.e. it might not have a parent. However, it is conceivable that the customer might not yet be the root of the tree. For example, there could be a "customer organization" resource that serves as the parent of the customer resource. In other words, a single customer organization A of business B could have multiple customers C, D, E. In the examples given, subscriptions, invoices, recurring payment resources, report generating resources, are on some level child resources of the customer. However, it is conceivable that recurring payment resources are children of a subscription, which in turn is the child of a customer.

In some embodiments, all accesses and updates of child resources, including internal calls, start with access to the parent resource and placement of a shared lock on the parent resource. Upon access, if the system determines that the parent resource has been deleted, the system prevents the requested access and/or update of the child resource. The system can also return an indication that the child resource has been deleted. Thus, even if the child resource has not been deleted by the system yet, the response to the access request (or update request) indicates that the child resource cannot be accessed (e.g., the response indicates that the child resource is not available, the response indicates that the child resource has been deleted, etc.). The system remains in a consistent state since any access of child resources of a deleted parent will also return deleted. Note that in some embodiments, there is an exception for a garbage collector that allows the garbage collector to access the parent resource even after the parent resource has been deleted as the garbage collector would need to asynchronously move the children resources to its terminal state (e.g. deleted, canceled, etc.).

The process of controlling access to a child resource by controlling access by first examining the parent resources and basing access control of the child resource on whether its parent resource of the child resource has been deleted applies to child resources of child resources as well. Specifically, any attempted access of such child resources of a one child resource starts by determining whether the parent resource of the one child resource has been deleted and based on the results of that determination the system permits access to child resources of the one child resource. Note that this process can be designed to continue up a tree to check any and all parent resources for their deletion such as shown in FIG. 3 in order to determine whether to permit access to the child resources.

In some embodiments, the access control is implemented at the data access layer so the semantics for access for internal and external APIs remain identical. In other words, the fact that the deletion state of the parent resource is used to control access to a child resource is invisible to the external user.

In some embodiments, at time of deletion, in response to the deletion request, the system takes an exclusive lock on the parent resource and then deletes the parent resource. In some embodiments, a garbage collector can asynchronously run clean up on any child resources that belong to a deleted parent resource. Since operations on both parent and child resources complete quickly, the lock duration is short. Furthermore, since accessing child resources only takes a shared lock on the parent resource, concurrent updates to different child resources of the same parent resource do not run into lock contention issues.

Figure 4:
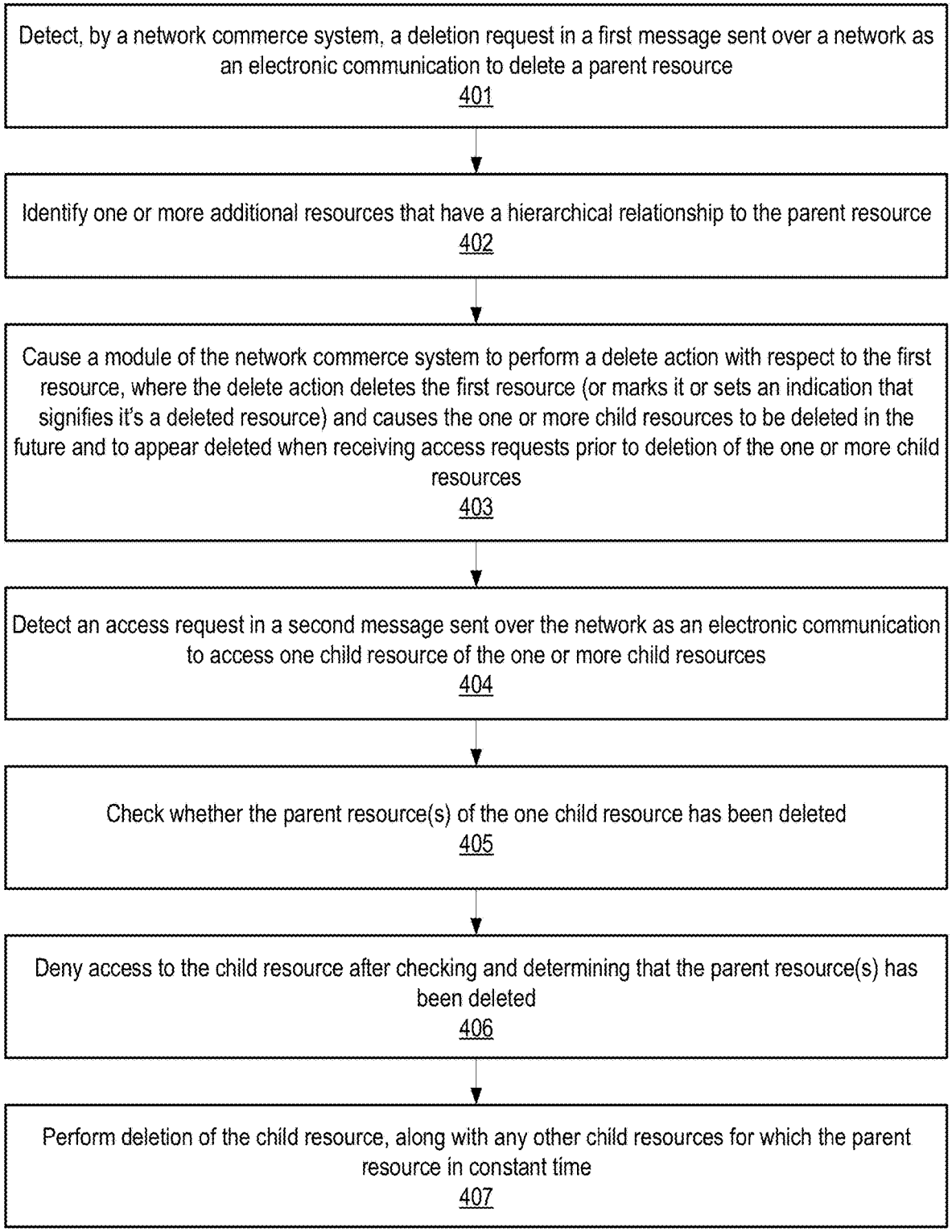
FIG. 4 is a flow diagram of one embodiment of a process for performing resource deletion.

One benefit of the technique described herein is that deletion requests can complete in constant time (ignoring natural variance of network), while accessing only one resource in a distributed system and ensuring the system is always consistent. Furthermore, there is no synchronous deletion of a large number of resources within the scope of a request, nor holding of any locks for a long period of time while the deletion of resources is happening. Moreover, there is also no additional pending delete state of the resource being deleted, which is an approach where the initial delete request gets accepted and the rest of the deletion happens in the background, with no bounds for when it will complete FIG. 4 is a flow diagram of one embodiment of a process for performing resource deletion. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a network commerce system, such as, for example, described in FIG. 1.

Referring to FIG. 4, the process begins processing logic detecting, by a network commerce system, a deletion request in a first message sent over a network as an electronic communication to delete a parent resource (processing block 401). In some embodiments, the parent resource is a parent in a parent-child relationship with one or more child resources.

After detecting the deletion request, processing logic identifies one or more additional resources that have a hierarchical relationship to the parent resource (processing block 402). In some embodiments, hierarchical relationships are predetermined during resource modeling. In some embodiments, the parent resource is a customer resource. In some embodiments, the parent resource is a user-facing resource.

In some embodiments, the user-facing resource is stored in a distributed system over a number of network locations. In some embodiments, the one or more parent resources comprise a set that includes the parent resource and at least one other parent resource in a parent-child relationship with the parent resource. In some embodiments, the one or more parent resources comprise a set that includes the parent resource and at least one other parent resource in a parent-child relationship with the parent resource.

Once the one or more additional resources have been identified, processing logic causes a module of the network commerce system to perform a delete action with respect to the first resource, where the delete action deletes the first resource (or marks it or sets an indication that signifies it's a deleted resource) and causes the one or more child resources to be deleted in the future and to appear deleted when receiving access requests prior to deletion of the one or more child resources (processing block 403).

In one embodiment, causing a module of the network commerce system to perform a delete action comprises the module deleting the first resource by: taking an exclusive lock on the first resource; and setting an indication to indicate the first resource has been deleted, the indication examined when access to any of the one or more child resources is requested to determine whether to grant access to any of the one or more child resources. In one embodiment, setting the indication comprises setting a bit associated with the first resource.

After deleting at least one of the parent resources, but prior to deleting the child resource, processing logic detects an access request in a second message sent over the network as an electronic communication to access one child resource of the one or more child resources (processing block 404) and checks whether the parent resource(s) of the one child resource has been deleted (processing block 405). In one embodiment, in response to the access attempt, processing logic takes a shared lock on the parent resource and then performs the check.

Processing logic denies access to the child resource after checking and determining that the parent resource(s) has been deleted (processing block 406).

Subsequently, processing logic performs deletion of the child resource, along with any other child resources for the parent resource (processing block 407). In some embodiments, the deletion of the child resource can occur at any time because any attempted access is blocked because its parent resource is checked before granted access and has been determined to be deleted.

Figure 5:
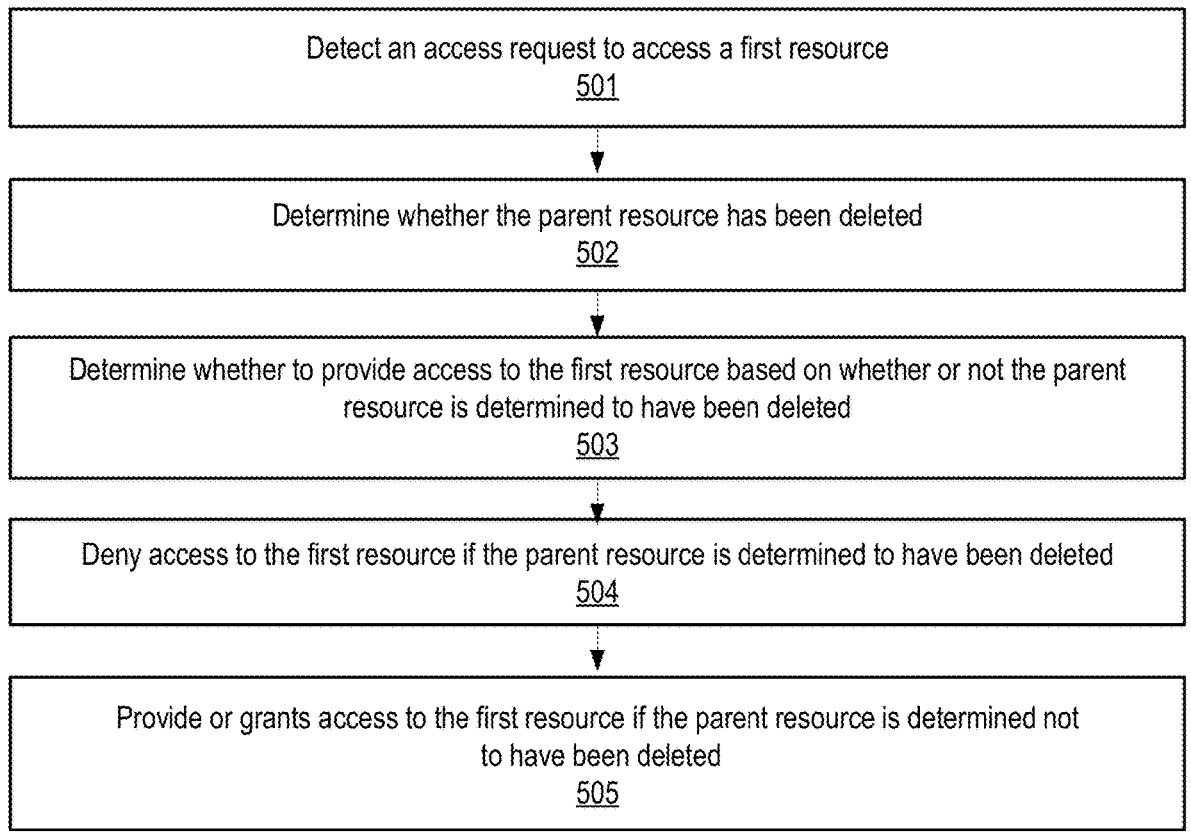
FIG. 5 is a flow diagram of one embodiment of a process for performing access control with respect to a resource (e.g., a child resource).

FIG. 5 is a flow diagram of one embodiment of a process for performing access control with respect to a resource (e.g., a child resource). In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a network commerce system, such as, for example, described in FIG. 1.

Referring to FIG. 5, the process begins by processing logic detecting an access request to access a first resource (processing block 501). In some embodiments, the access request is in a message sent over the network as an electronic communication. In some embodiments, the first resource is a child resource in a parent-child relationship with a parent resource. In some embodiments, the processing logic detects the access request as part of the network commerce system.

After detecting the access request, processing logic determines whether the parent resource has been deleted (processing block 502) and then determines whether to provide access to the first resource based on whether or not the parent resource is determined to have been deleted (processing block 503). In some embodiments, the parent resource is a part of a chain of parent-child relationships in a hierarchy, including being in a parent-child relationship with another parent resource, and further wherein determining access to the first resource based on whether or not the parent resource is determined to have been deleted comprises determining access to the first resource based on whether or not the parent resource is determined to have been deleted or whether another parent higher in the hierarchy (e.g., higher in a tree hierarchy) has been deleted.

Processing logic denies access to the first resource if the parent resource is determined to have been deleted (processing block 504) or provides or grants access to the first resource if the parent resource is determined not to have been deleted (processing block 505).

Figure 6:
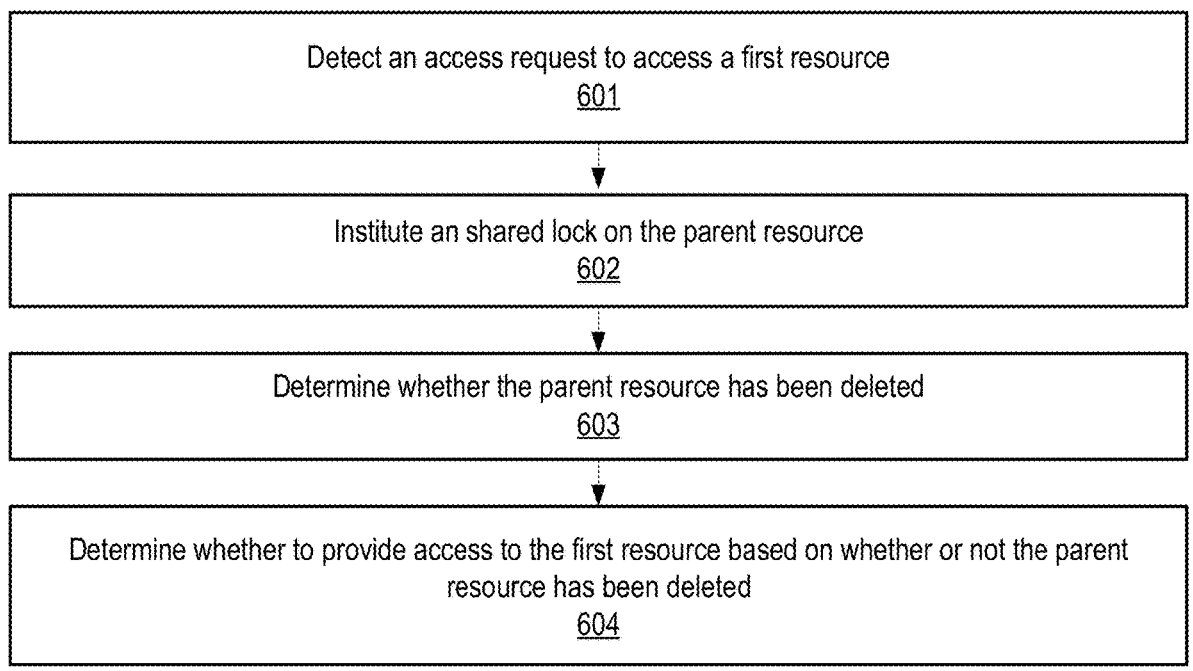
FIG. 6 is a flow diagram of another embodiment of a process for performing access control with respect to a resource (e.g., a child resource).

FIG. 6 is a flow diagram of another embodiment of a process for performing access control with respect to a resource (e.g., a child resource). In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a network commerce system, such as, for example, described in FIG. 1.

Referring to FIG. 6, the process begins by processing logic detecting an access request to access a first resource (processing block 601). In some embodiments, the access request is in a message sent over the network as an electronic communication. In some embodiments, the first resource is a child resource in a parent-child relationship with a parent resource. In some embodiments, the processing logic detects the access request as part of the network commerce system.

After detecting the access request, processing logic institutes an shared lock on the parent resource (processing block 602) and determines whether the parent resource has been deleted (processing block 603).

Once processing logic determines whether the parent resource has been deleted, processing logic determines whether to provide access to the first resource based on whether or not the parent resource has been deleted (processing block 604). In some embodiments, processing logic denies access to the first resource if the parent resource is determined to have been deleted or grants access to the first resource if the parent resource is determined not to have been deleted.

In some embodiments, instead of checking whether a parent resource has been deleted in response to receiving an access request to a child resource, the information regarding the deletion of a parent resource(s) may be maintained in memory (e.g., cache memory). In this way, when the access request is received, instead of checking each of the parent resources to determine whether or not they have been deleted, the access control logic merely checks the memory to obtain the information and then determines whether to grant access based on whether the parent resource(s) has been deleted.

Figure 7:
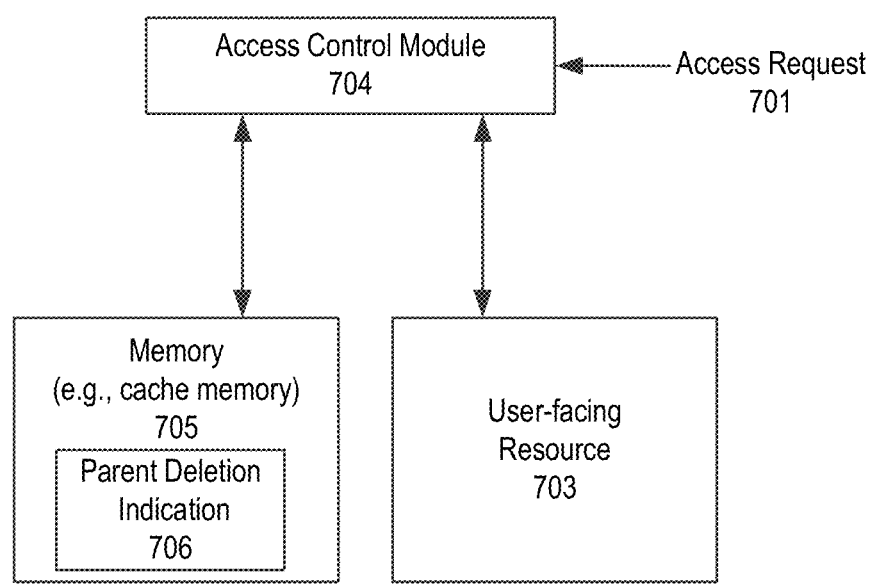
FIG. 7 illustrates a portion of a commerce platform that provides access to a resource based on cache information indicating whether a parent to the resource has been deleted.

FIG. 7 illustrates a portion of a commerce platform that provides access to a resource based on cache information indicating whether a parent to the resource has been deleted. Referring to FIG. 7, an access control module 704 receives an access request 701 to access user-facing resource 703 and determines whether to provide access by determining whether its parent resource (e.g., a parent resource in FIG. 2) or a parent resource in the hierarchy (e.g., a parent in FIG. 3) has been deleted. To do so, instead of accessing its parent resource or all of the parent resources in the hierarchy in which user-facing resource 703 resides and determining whether such resource has been deleted, access control module 704 access memory 705 (e.g., cache memory) that maintains parent deletion information 706 and obtains a cached indication of whether such a deletion has already occurred. In other words, the determination of whether such a deletion has already been made and cached prior to the occurrence of access request 701. Using this information, access control module 704 determines whether to provide access in response to access request 701.

In some embodiments, access control module 704 or some other module regularly checks each of the parent resources in the hierarchy to determine they have not been deleted and stores an indication (e.g., a bit) for user-facing resource 703. Alternatively, parent resources in the hierarchy regularly provide an indication to access control module 704 indicating they have not been deleted and access control module 704 uses this information to create and store parent deletion information 706. In some embodiments, this indication received from the parent resources can be like a heartbeat message.

An Example Computer System

Figure 8:
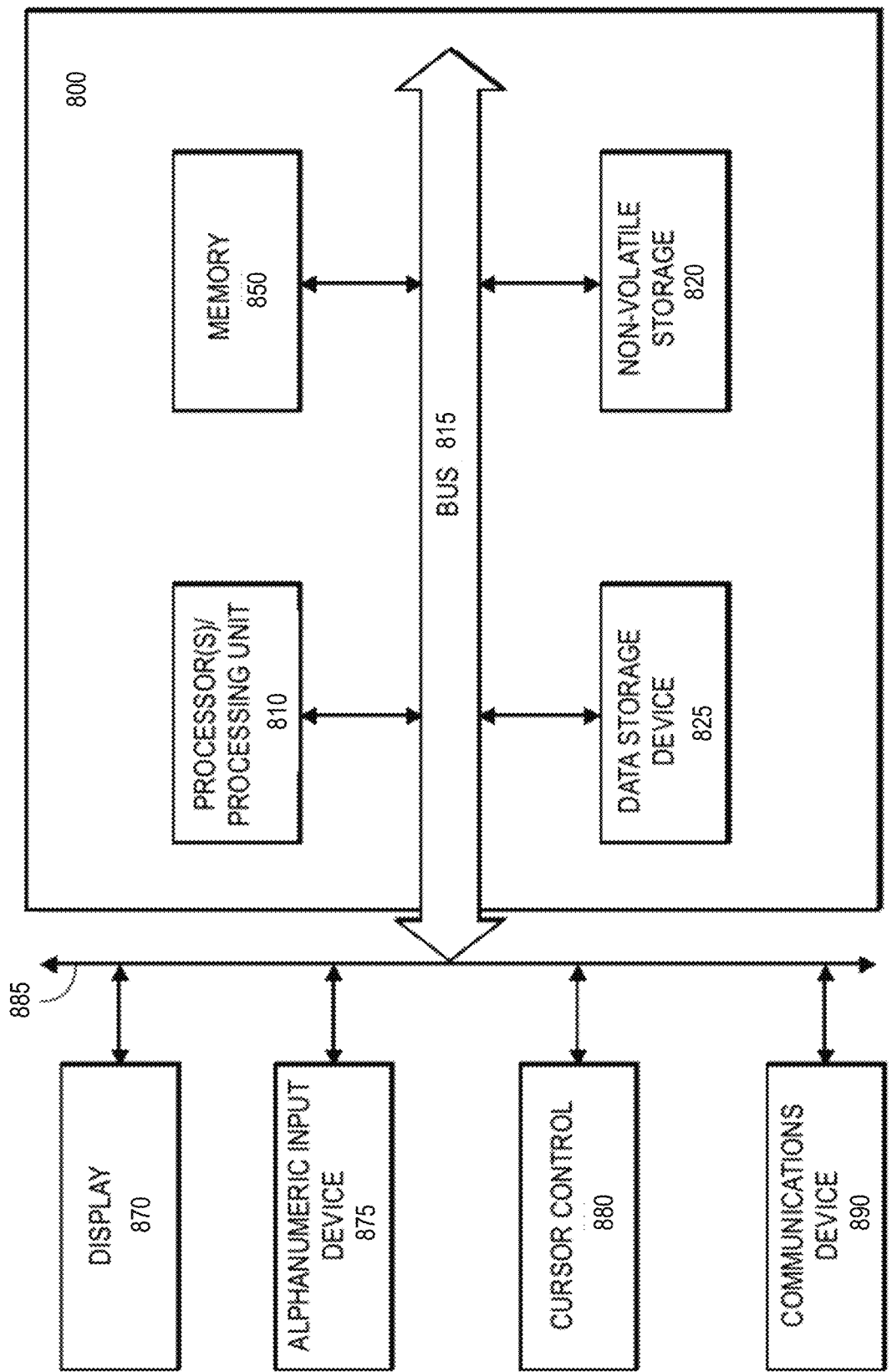
FIG. 8 is one embodiment of a computer system that may be used to support the systems and operations discussed herein.

FIG. 8 is one embodiment of a computer system that may be used to support the systems and operations discussed herein. It will be apparent to those of ordinary skill in the art, however, that other alternative systems of various system architectures may also be used.

The data processing system illustrated in FIG. 8 includes a bus or other internal communication means 815 for communicating information, and a processor(s) 810 coupled to the bus 815 for processing information. The system further comprises a random-access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor(s) 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

In some embodiments, processor(s) 810 executes instructions to perform any of the operations described above including, but not limited to, performing deletion actions to delete a parent resource (e.g., as part of a deletion module being executed), access control to determine whether to give access to a resource (e.g., a user-facing resource, a child resource, etc.), grant or deny access to a resource, accessing parent resources and/or determined whether parent resources have been deleted, creating and storing parent deletion information, etc.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 885, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need to be present for the device to function.

There is a number of example embodiments described herein.

Example 1 is a method comprising: detecting, by a network commerce system, a deletion request in a first message sent over a network as an electronic communication to delete a first resource; identifying one or more additional resources that have a hierarchical relationship to the first resource, including identifying one or more child resources related the first resource, the one or more child resources being in a parent-child relationship with the first resource as the parent; causing a module of the network commerce system to perform a delete action with respect to the first resource, where the delete action deletes the first resource and causes the one or more child resources to be deleted in the future and to appear deleted when receiving access requests prior to deletion of the one or more child resources; detecting, by the network commerce system, an access request in a second message sent over the network as an electronic communication to access one child resource of the one or more child resources after deletion of the first resource but prior to deletion of the one child resource; determining, in response to the access request, if the first resource has been deleted; and denying access to the one child resource if the first resource is determined to have been deleted.

Example 2 is the method of example 1 that may optionally include taking a shared lock on the first resource in response to receiving the access request the one child resource, and thereafter determining if the first resource has been deleted.

Example 3 is the method of example 1 that may optionally include that the one or more child resources comprise a set of one or more resources in a parent-child relationship with another child resource in the one or more child resources.

Example 4 is the method of example 1 that may optionally include that causing a module of the network commerce system to perform a delete action comprises the module deleting the first resource by: taking an exclusive lock on the first resource; and setting an indication to indicate the first resource has been deleted, the indication examined when access to any of the one or more child resources is requested to determine whether to grant access to any of the one or more child resources.

Example 5 is the method of example 4 that may optionally include that setting the indication comprises setting a bit associated with the first resource.

Example 6 is the method of example 1 that may optionally include that the first resource is a customer resource.

Example 7 is the method of example 1 that may optionally include that the first resource is a user-facing resource.

Example 8 is the method of example 7 that may optionally include that the user-facing resource is stored in a distributed system over a number of network locations.

Example 9 is the method of example 8 that may optionally include performing deletion of the user-facing resource, responsive to the delete action, in constant time.

Example 10 is a system comprising: a memory to store instructions; and one or more processors coupled to the memory to execute the stored instructions to: detect, by a network commerce system, a deletion request in a first message sent over a network as an electronic communication to delete a first resource; identify one or more additional resources that have a hierarchical relationship to the first resource, including identifying one or more child resources related the first resource, the one or more child resources being in a parent-child relationship with the first resource as the parent; cause a module of the network commerce system to perform a delete action with respect to the first resource, where the delete action deletes the first resource and causes the one or more child resources to be deleted in the future and to appear deleted when receiving access requests prior to deletion of the one or more child resources; detect, by the network commerce system, an access request in a second message sent over the network as an electronic communication to access one child resource of the one or more child resources after deletion of the first resource but prior to deletion of the one child resource; determine, in response to the access request, if the first resource has been deleted; and deny access to the one child resource if the first resource is determined to have been deleted.

Example 11 is the system of example 10 that may optionally include taking a shared lock on the first resource in response to receiving the access request for the one child resource, and thereafter determining if the first resource has been deleted.

Example 12 is the system of example 10 that may optionally include that the one or more child resources comprise a set of one or more resources in a parent-child relationship with another child resource in the one or more child resources.

Example 13 is the system of example 10 that may optionally include that causing a module of the network commerce system to perform a delete action comprises the module deleting the first resource by: taking an exclusive lock on the first resource; and setting an indication to indicate the first resource has been deleted, the indication examined when access to any of the one or more child resources is requested to determine whether to grant access to any of the one or more child resources.

Example 14 is the system of example 10 that may optionally include that the first resource is a user-facing resource.

Example 15 is the system of example 14 that may optionally include performing deletion of the user-facing resource, responsive to the delete action, in constant time.

Example 16 is one or more non-transitory computer readable storage media having instructions stored thereupon which, when executed by a system having at least a processor and a memory therein, cause the system to perform operations comprising: detecting, by a network commerce system, a deletion request in a first message sent over a network as an electronic communication to delete a first resource; identifying one or more additional resources that have a hierarchical relationship to the first resource, including identifying one or more child resources related the first resource, the one or more child resources being in a parent-child relationship with the first resource as the parent; causing a module of the network commerce system to perform a delete action with respect to the first resource, where the delete action deletes the first resource and causes the one or more child resources to be deleted in the future and to appear deleted when receiving access requests prior to deletion of the one or more child resources; detecting, by the network commerce system, an access request in a second message sent over the network as an electronic communication to access one child resource of the one or more child resources after deletion of the first resource but prior to deletion of the one child resource; determining, in response to the access request, if the first resource has been deleted; and denying access to the one child resource if the first resource is determined to have been deleted Example 17 is the one or more or more non-transitory computer readable storage media of example 16 that may optionally include taking a shared lock on the first resource in response to receiving the access request for the one child resource, and thereafter determining if the first resource has been deleted.

Example 18 is the one or more non-transitory computer readable storage media of example 16 that may optionally include that the one or more child resources comprise a set of one or more resources in a parent-child relationship with another child resource in the one or more child resources.

Example 19 is the one or more or more non-transitory computer readable storage media of example 16 that may optionally include that causing a module of the network commerce system to perform a delete action comprises deleting the first resource comprises: taking an exclusive lock on the first resource; and setting an indication to indicate the first resource has been deleted, the indication examined when access to any of the one or more child resources is requested to determine whether to grant access to any of the one or more child resources.

Example 20 is the one or more or more non-transitory computer readable storage media of example 16 that may optionally include that the first resource is a user-facing resource, and the method further comprises performing deletion of the user-facing resource, responsive to the delete action, in constant time.

Example 21 is a method comprising: detecting, by the network commerce system, an access request in a message sent over the network as an electronic communication to access a child resource, the child resource being in a parent-child relationship with a parent resource; determining, in response to the access request, if the parent resource has been deleted; and determining access to the child resource based on whether or not the parent resource is determined to have been deleted.

Example 22 is the method of example 21 that may optionally include denying access to the first resource if the parent resource is determined to have been deleted.

Example 23 is the method of example 21 that may optionally include providing access to the first resource if the parent resource is determined not to have been deleted.

Example 24 is the method of example 21 that may optionally include instituting a shared lock on the parent resource in response to the access request prior to determining if the parent resource has been deleted.

Example 25 is the method of example 21 that may optionally include that the parent resource is a part of a chain of parent-child relationships in a hierarchy and is in a parent-child relationship with another parent resource, and further wherein determining access to the child resource based on whether or not the parent resource is determined to have been deleted comprises determining access to the child resource based on whether or not the parent resource is determined to have been deleted or whether another parent in the hierarchy has been deleted.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising: detecting, by a network commerce system, a deletion request in a first message sent over a network as an electronic communication to delete a first resource;
   identifying one or more additional resources that have a hierarchical relationship to the first resource, including identifying one or more child resources related the first resource, the one or more child resources being in a parent-child relationship with the first resource as the parent;
   causing a module of the network commerce system to perform a delete action with respect to the first resource, where the delete action deletes the first resource and causes the one or more child resources to be deleted in the future and to appear deleted when receiving access requests prior to deletion of the one or more child resources; and
   after deletion of the first resource but prior to deletion of the one child resource,
   detecting, by the network commerce system, an access request in a second message sent over the network as an electronic communication to access one child resource of the one or more child resources;
   in response to detecting the access request to access the one child resource and prior to attempting to access the one child resource, attempting to access the first resource and placing a shared lock on the first resource;
   determining, in response to the access request, if the first resource has been deleted; and
   denying access to the one child resource upon determining that the first resource has been deleted.

2. The method of claim 1 wherein the one or more child resources comprise a set of one or more resources in a parent-child relationship with another child resource in the one or more child resources.

3. The method of claim 1 wherein causing a module of the network commerce system to perform a delete action comprises the module deleting the first resource by: taking an exclusive lock on the first resource; and
   setting an indication to indicate the first resource has been deleted, the indication examined when access to any of the one or more child resources is requested to determine whether to grant access to any of the one or more child resources.

4. The method of claim 3 wherein setting the indication comprises setting a bit associated with the first resource.

5. The method of claim 1 wherein the first resource is a customer resource.

6. The method of claim 1 wherein the first resource is a user-facing resource.

7. The method of claim 6 wherein the user-facing resource is stored in a distributed system over a number of network locations.

8. The method of claim 7 further comprising performing deletion of the user-facing resource, responsive to the delete action, in constant time.

9. A system comprising: a memory to store instructions; and
one or more processors coupled to the memory to execute the stored instructions to: detect, by a network commerce system, a deletion request in a first message sent over a network as an electronic communication to delete a first resource; identify one or more additional resources that have a hierarchical relationship to the first resource, including identifying one or more child resources related the first resource, the one or more child resources being in a parent-child relationship with the first resource as the parent;
cause a module of the network commerce system to perform a delete action with respect to the first resource, where the delete action deletes the first resource and causes the one or more child resources to be deleted in the future and to appear deleted when receiving access requests prior to deletion of the one or more child resources; and
after deletion of the first resource but prior to deletion of the one child resource, detect, by the network commerce system, an access request in a second message sent over the network as an electronic communication to access one child resource of the one or more child resources;
in response to detecting the access request to access the one child resource and prior to attempting to access the one child resource, attempt to access the first resource and place a shared lock on the first resource:
determine, in response to the access request, if the first resource has been deleted; and
deny access to the one child resource upon determining that # the first resource has been deleted.

10. The system of claim 9 wherein the one or more child resources comprise a set of one or more resources in a parent-child relationship with another child resource in the one or more child resources.

11. The system of claim 9 wherein causing a module of the network commerce system to perform a delete action comprises the module deleting the first resource by: taking an exclusive lock on the first resource; and
setting an indication to indicate the first resource has been deleted, the indication examined when access to any of the one or more child resources is requested to determine whether to grant access to any of the one or more child resources.

12. The system of claim 9 wherein the first resource is a user-facing resource.

13. The system of claim 12 further comprising performing deletion of the user-facing resource, responsive to the delete action, in constant time.

14. One or more non-transitory computer readable storage media having instructions stored thereupon which, when executed by a system having at least a processor and a memory therein, cause the system to perform operations comprising: detecting, by a network commerce system, a deletion request in a first message sent over a network as an electronic communication to delete a first resource;
identifying one or more additional resources that have a hierarchical relationship to the first resource, including identifying one or more child resources related the first resource, the one or more child resources being in a parent-child relationship with the first resource as the parent;
causing a module of the network commerce system to perform a delete action with respect to the first resource, where the delete action deletes the first resource and causes the one or more child resources to be deleted in the future and to appear deleted when receiving access requests prior to deletion of the one or more child resources; and
after deletion of the first resource but prior to deletion of the one child resource, detecting, by the network commerce system, an access request in a second message sent over the network as an electronic communication to access one child resource of the one or more child resources;
in response to detecting the access request to access the one child resource and prior to attempting to access the one child resource, attempting to access the first resource and placing a shared lock on the first resource;
determining, in response to the access request, if the first resource has been deleted; and denying access to the one child resource upon determining that the first resource has been deleted.

15. The one or more non-transitory computer readable storage media of claim 14 wherein the one or more child resources comprise a set of one or more resources in a parent-child relationship with another child resource in the one or more child resources.

16. The one or more non-transitory computer readable storage media of claim 14 wherein causing a module of the network commerce system to perform a delete action comprises deleting the first resource comprises: taking an exclusive lock on the first resource; and
setting an indication to indicate the first resource has been deleted, the indication examined when access to any of the one or more child resources is requested to determine whether to grant access to any of the one or more child resources.

17. The one or more non-transitory computer readable storage media of claim 14 wherein the first resource is a user-facing resource, and the method further comprises performing deletion of the user-facing resource, responsive to the delete action, in constant time.

* * * * *